Aug. 8, 1961   L. O. CARLSEN ET AL   2,994,943
CUTTER FOR SPIRAL BEVEL OR HYPOID GEARS
Original Filed Dec. 30, 1957   2 Sheets-Sheet 1

INVENTORS
LEONARD O. CARLSEN
CHARLES B. KING
BY
*Richard W. Treverton*
ATTORNEY

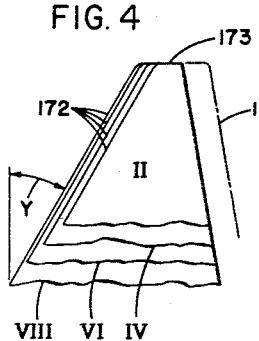
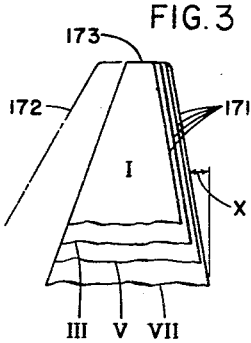
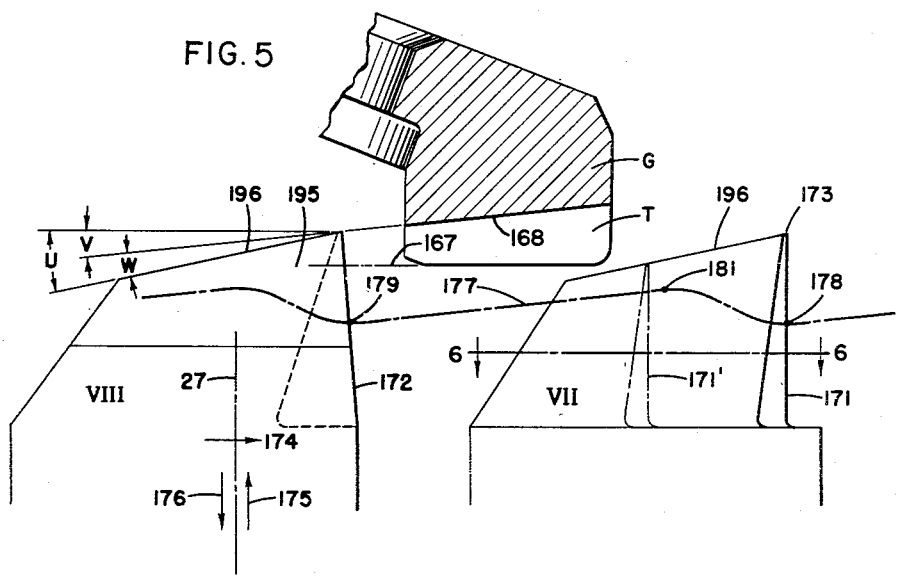
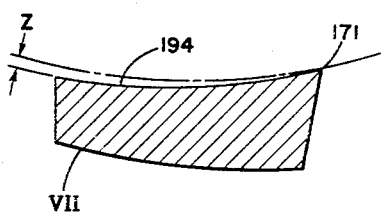
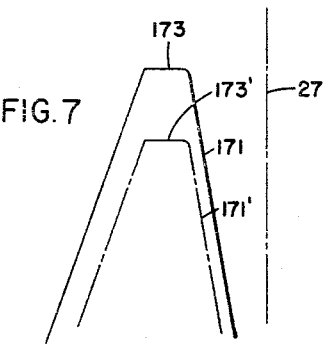

United States Patent Office 2,994,943
Patented Aug. 8, 1961

2,994,943
CUTTER FOR SPIRAL BEVEL OR HYPOID GEARS
Leonard O. Carlsen, Rochester, and Charles B. King, Brighton, N.Y., assignors to The Gleason Works, Rochester, N.Y., a corporation of New York
Original application Dec. 30, 1957, Ser. No. 705,931. Divided and this application Dec. 19, 1958, Ser. No. 781,516
3 Claims. (Cl. 29—105)

The present invention relates to a face mill cutter for spiral bevel or hypoid gears having teeth of tapering depth, and is a division of our application Serial No. 705,931, filed December 30, 1957.

The cutter is of the alternate blade type, adapted to finish cut both sides of the gear teeth as helicoidal surfaces by a method in which the cutter is in continuous rotation throughout the cutting of all of the teeth of the gear, and is advanced axially toward the work while each blade is cutting and is withdrawn axially during the interval between the conclusion of cutting by one blade and the beginning of cutting by the following blade. Intermittent indexing of the gear, to bring successive tooth spaces thereof into position for cutting, occurs whenever a relatively wide space between the last and first cutting blades comes abreast of the gear, permitting continuous cutter rotation.

Figure 1:
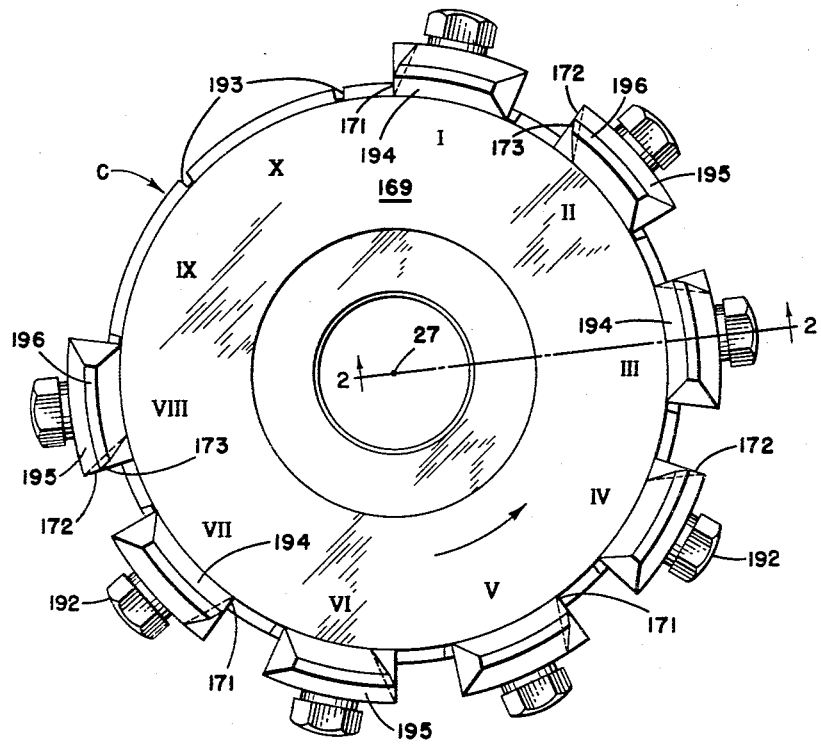
Figure 2:
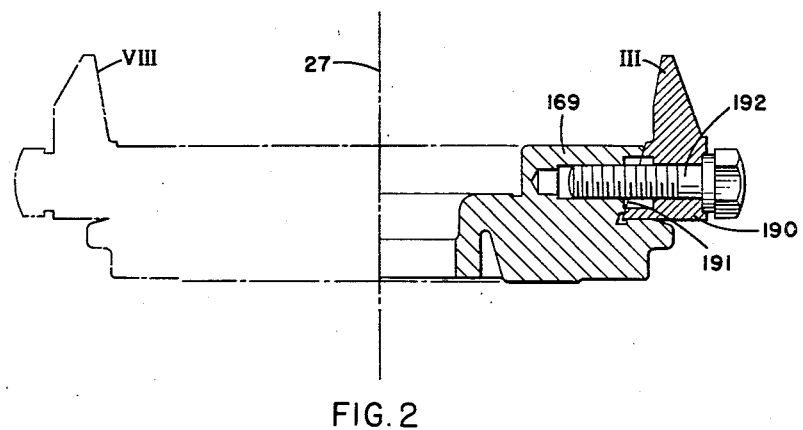

In the drawings:
FIG. 1 is a front or face view of the cutter;
FIG. 2 is a sectional view in plane 2—2 of FIG. 1, which contains the cutter axis;
FIG. 3 is a diagram showing the relationship of the several inside cutting blades of the cutter;
FIG. 4 is a similar diagram showing the relationship of the outside cutting blades of the cutter;
FIG. 5 is a diagram showing the path of the cutter blades across the face of a work gear;
FIG. 6 is a section through one blade of the cutter in plane 6—6 of FIG. 5; and
FIG. 7 is a fragmentary front view of one cutter blade illustrating the manner in which the blade is relieved.

The cutter comprises a body 169 having blades numbered I to VIII projecting therefrom in the general direction of axis 27, and two empty blade spaces numbered IX and X which constitute a gap between the first and last blades. The machine on which the cutter is mounted, which may be of the kind shown in our application Serial No. 705,931, is so timed that this gap is abreast of the work when tooth-to-tooth indexing of the work occurs, thus enabling cutter rotation to be continuous. Blades I, III, V and VII have inside cutting edges 171 for cutting the convex sides of the gear teeth, and, as shown in FIG. 3, these edges are progressively offset from each other. Blades I, III and V remove most of the stock from the tooth sides, leaving only a very thin layer to be removed by the finishing blade VII. Similarly the blades II, IV, VI and VIII, FIG. 4, of which the last is the finishing blade, have side cutting edges 172 for the concave sides of the teeth. These blades are offset from each other by being disposed at progressively greater radial distances from axis 27. The tip edges 173 of all blades lie in the same plane perpendicular to the cutter axis.

As the cutter rotates in the direction of the arrow in FIG. 1, about its axis 27, the cutter blades successively traverse a tooth space being cut from its small end to its large end, i.e. from left to right in FIG. 5. During such traversal each blade moves in a helical path resulting from rotation of the cutter about axis 27 in the direction of arrow 174 and also along the axis in the direction of arrow 175. As soon as a blade has traversed the tooth, the axial motion is reversed and is in the direction indicated by arrow 176. This brings the next blade into position to begin cutting. In FIG. 5 the dash-dot line 177 represents the path of arbitrarily selected points 178 and 179 on the cutting edges 171 and 172 of blades VII and VIII. As shown, the blade VIII is ready to start cutting and will follow the helical path 177 between points 179 and 181 which is the resultant of rotation 174 and axial motion 175, to advance the cutter C into the work. The blade VII shown in FIG. 5 completed its traversal of the tooth space before reaching point 181 and since then has followed the return portion of the helical path 177 from point 181 to the point 178, this return portion being the resultant of rotation 174 and axial motion 176. Motion 176 is preferably somewhat faster than the axial advance 175.

In the illustrated embodiment the cutter, having ten equal blade spaces, is designed for ten reciprocations 175, 176 per revolution, so that the feed path 177, only a portion of which appears in FIG. 5, has around the cutter ten identical helical infeed sections, like the portion thereof between points 179 and 181, connected by ten identical return sections like that between points 181 and 178. Inasmuch as the cutting edges of the blades, as shown in FIG. 1, are spaced around the cutter at intervals of one tenth of the cutter circumference, every one of them, considered in the static condition of the cutter, is disposed in the same circumferential relation to a different one of the infeed sections.

The cutter blades have segmental shanks 190 formed to fit in a shallow V-shaped peripheral groove 91 on the cutter body 169. Each blade is secured to the body by a screw 192 which extends radially of the cutter axis 27. Positioning pins secured in notches 193 in the periphery of the cutter body abut the rear faces of the blade shanks. The side surfaces 194 of the blades back of the inside cutting edges 171, the side surfaces 195 back of outside cutting edges 172, and the tip surfaces 196 back of tip edges 173, are helicoidal surfaces which are coaxial with the cutter axis 27 and are all of the same axial lead. In FIG. 7 the solid lines 171 and 173 show the cutting profile shape of an inside cutting blade in a plane containing the cutter axis, while the dotted lines 171' and 173' show the corresponding profile shape, also in an axial plane, when the front face of the cutter blade is sharpened back to bring the side cutting edge to dotted line position 171' in FIG. 5. The lines 171 and 171' in FIG. 7 may or may not be perfectly straight lines, depending upon the position of the sharpening plane, i.e. the plane of the front face of the blade, in relation to the cutter axis. As shown the profile shape 171, 173 is the same as 171', 173' except that the latter is displaced from the former in the direction of the cutter axis 27. Hence after resharpening the cutter the original relationship between the cutting edges and the work can be restored by simply adjusting the work head of the machine toward the cutter in a direction parallel to the cutter axis.

The axial lead of the helicoidal blade surfaces 194, 195 and 196 is greater than the axial lead of the helical path 177 between points 179 and 181 which is followed by the blades while they cut. That is, referring to FIG. 5, the lead angle U of the helicoidal tip surface 196 is greater than the lead angle V of helical path 179—181 by the angle W which constitutes the cutter tip clearance angle. The lead angle V depends upon the depthwise taper of the teeth T, the axial motion 175 being at such rate relative to the rotation 174 that, although the cutter axis lies in a plane substantially perpendicular to the face plane 167 of the gear at the tooth space being cut, the blades while cutting move in the helical path 177 which, as shown, substantially parallels the root surface 168 of the tooth space. For given angles V and W the cutter side clearance angles, i.e. the angles between the blade sides 194 and 195 and the respective tooth sides of the gear, depends upon the pressure angles of the blades, these being the angles designated X and Y in FIGS. 3 and 4. In the illustrated cutter where these angles are positive angles respectively of ten degrees and thirty degrees, and where the angles V and W are each approximately six degrees, the side clearance angles are on the order of two and seven degrees, respectively. Whatever blade pressure angles are chosen, it is essential that the angular difference W between the helical cutting path of the blades and the helicoidal surfaces of the blade be large enough to provide an adequate clearance angle, such as angle Z in FIG. 6, between whichever one of the blade sides 194 and 195 has the lowest pressure angle and the related tooth side.

We claim as our invention:

1. A multi-bladed face mill cutter for finish cutting a spiral bevel or hypoid gear of tapering tooth depth and with helicoidal tooth sides, the cutter being characterized by having a plurality of blades arranged along a feed path extending around the cutter which comprises an even number of equally spaced and identical helical infeed sections connected by identical return sections, alternate blades respectively having inside and outside cutting edges of positive pressure angle and each blade having a tip cutting edge, a different one of said blades being arranged along each of said infeed sections except an even number of successive ones thereof along which there are no blades, whereby an indexing gap is provided, every blade for cutting the same tooth side of the gear being in the same circumferential relation to its infeed section, successive side cutting edges for the same tooth side of the gear, following said gap in the order of cutting, being at progressively different distances from the cutter rotation axis to thereby provide for the removal of successive layers of stock from the tooth side, the side surfaces of the blades back of the side cutting edges all being helicoidal surfaces of the same axial lead and having the helix axes thereof coincident with said rotation axis, and the axial lead of said helicoidal surfaces being sufficiently greater than the axial lead of said infeed sections to provide a clearance angle between said helicoidal surfaces and the helicoidal tooth sides of the gear being cut.

2. A cutter according to claim 1 in which each of said infeed sections is of greater extent angularly about the cutter axis than the tooth slots of the work gear.

3. A cutter according to claim 1 wherein the infeed sections along which there are no blades are two in number.

References Cited in the file of this patent

UNITED STATES PATENTS

| | | |
|---|---|---|
| 1,969,843 | Head | Aug. 14, 1934 |
| 2,125,943 | McMullen | Aug. 9, 1938 |
| 2,126,004 | Gleason | Aug. 9, 1938 |
| 2,129,056 | Gleason | Sept. 6, 1938 |
| 2,236,909 | Johanson | Apr. 1, 1941 |
| 2,273,908 | Stewart | Feb. 24, 1942 |
| 2,586,428 | Hartman | Feb. 19, 1952 |
| 2,648,894 | Wildhaber | Aug. 18, 1953 |